United States Patent [19]
Noone et al.

[11] Patent Number: 5,469,892
[45] Date of Patent: Nov. 28, 1995

[54] CORRUGATED POLYMERIC TUBING HAVING AT LEAST THREE LAYERS WITH AT LEAST TWO RESPECTIVE LAYERS COMPOSED OF POLYMERIC MATERIALS DISSIMILAR TO ONE ANOTHER

[75] Inventors: David L. Noone, Marsberg, Germany; Frank L. Mitchell, Rochester, Mich.

[73] Assignee: ITT Automotive, Inc., Auburn Hills, Mich.

[21] Appl. No.: 227,511

[22] Filed: Apr. 14, 1994

Related U.S. Application Data

[63] Continuation-in-part of Ser. No. 868,754, Apr. 14, 1992, and Ser. No. 962,496, Oct. 16, 1992.
[51] Int. Cl.⁶ .................................................... F16L 11/04
[52] U.S. Cl. ...................... 138/121; 138/122; 138/137; 138/DIG. 1; 138/DIG. 7; 361/215; 174/47
[58] Field of Search ..................................... 138/124, 125, 138/126, 127, 137, 140, 141, 177, 103, DIG. 1, DIG. 3, DIG. 7, 121, 122; 428/36.91; 174/47; 361/215

[56] References Cited

U.S. PATENT DOCUMENTS

| | | |
|---|---|---|
| 3,473,087 | 10/1989 | Slade. |
| 3,561,493 | 2/1971 | Maillard et al. |

(List continued on next page.)

FOREIGN PATENT DOCUMENTS

| | | |
|---|---|---|
| 0551094 | 7/1993 | European Pat. Off. |
| 2114550 | 6/1972 | France. |
| 2577564 | 8/1986 | France. |
| 2577168 | 8/1986 | France. |
| 1779905 | 2/1972 | Germany. |
| 3821723 | 9/1989 | Germany. |
| 9001467 | 4/1990 | Germany. |
| 4001126 | 12/1990 | Germany. |
| 4001125 | 12/1990 | Germany. |
| 9007303 | 12/1990 | Germany. |
| 3942354 | 6/1991 | Germany. |
| 4006870 | 7/1991 | Germany. |
| 9400522 | 1/1994 | Germany. |
| 2204376 | 11/1988 | United Kingdom. |

OTHER PUBLICATIONS

Tefzel—Safety in Handling and Use, pp. 1–3, 20–21, 35–37.
State of California Air Resources Board, pp. 1–2, A2–A4, B2–B43, Aug. 9, 1990.
Conductive Polymers and Plastics (Chapman and Hall, New York) James M. Margolis, pp. 119–124, Copyright 1989.

(List continued on next page.)

*Primary Examiner*—James E. Bryant, III
*Attorney, Agent, or Firm*—Robert P. Seitter; J. Gordon Lewis

[57] ABSTRACT

A multi-layer tube suitable for use on motor vehicles composed of a cylindrical wall having an outer surface, and an inner surface essentially parallel to the outer surface. The cylindrical wall has a first region having an essentially uniform cross-sectional diameter and a second region which has a cross-sectional diameter differing from the essentially uniform cross-sectional diameter of the first region. The second region has at least one convolution or corrugation contiguously adjacent to the cylindrical wall of the first region. The cylindrical wall is made up of a thick flexible outer layer having an inner and an outer face, composed of an extrudable melt-processible thermoplastic; a thin intermediate bonding layer bonded to the inner face of the thick outer layer, composed of an extrudable melt-processible thermoplastic capable of sufficiently permanent laminar adhesion to the outer layer to prevent delamination during the desired lifetime of the tubing; and an interior layer composed of an extrudable melt-processible thermoplastic which is capable of sufficiently permanent laminar adhesion to the intermediate bonding layer to prevent delamination of the tubing during the desired lifetime. The thermoplastic material in the interior layer has an elongation value at break of at least 150% and an ability to withstand impacts of at least 2 foot-pounds below about −20° C. The inner layer has a thickness less than the thickness of the outer layer.

26 Claims, 2 Drawing Sheets

U.S. PATENT DOCUMENTS

| | | |
|---|---|---|
| 3,670,132 | 12/1962 | Sheridan . |
| 3,828,112 | 8/1974 | Johansen et al. . |
| 3,907,955 | 9/1975 | Viennot . |
| 4,059,847 | 11/1977 | Phillips et al. . |
| 4,272,585 | 6/1981 | Strassel . |
| 4,273,798 | 6/1981 | Scheiber . |
| 4,303,457 | 12/1981 | Johansen et al. . |
| 4,330,017 | 5/1982 | Satoh et al. . |
| 4,448,748 | 5/1984 | Radtke et al. . |
| 4,675,780 | 6/1987 | Barnes et al. . |
| 4,685,090 | 8/1987 | Krevor . |
| 4,853,297 | 8/1989 | Takahashi et al. . |
| 4,880,036 | 11/1989 | Kitami et al. . |
| 4,887,647 | 12/1989 | Igarashi et al. . |
| 4,907,830 | 3/1990 | Sasa et al. . |
| 4,984,604 | 1/1991 | Nishimura . |
| 4,990,383 | 2/1991 | Bergström et al. . |
| 5,019,309 | 5/1991 | Brunnhofer . |
| 5,038,833 | 8/1991 | Brunnhofer . |
| 5,076,329 | 12/1991 | Brunnhofer . |
| 5,080,405 | 1/1992 | Sasa et al. . |
| 5,112,692 | 5/1992 | Strassel et al. . |
| 5,142,782 | 9/1992 | Martucci . |
| 5,143,122 | 9/1992 | Adkins . |
| 5,148,837 | 9/1992 | Åqren et al. .................... 138/121 |
| 5,167,259 | 12/1992 | Brunnhofer . |
| 5,170,011 | 12/1992 | Martucci . |
| 5,219,003 | 6/1993 | Kerschbaumer . |
| 5,284,184 | 2/1994 | Noone et al. . |

OTHER PUBLICATIONS

Rosato, Donald V. et al., Designing With Plastic and Composites: A Handbook, pp. B18–B33, Copyright 1991.

Product Data Bulletin, EMS Engineering Polymers.

Product Information, Vestamid Nylon 12, Huls America, Inc.

Material Safety Data, Advanced Elastomer Systems, pp. 1–5, Santoprene Thermoplastic Rubber FR Grades, Dec. 1, 1990.

Santoprene Product Data Sheet, Advanced Elastomer Systems.

Santoprene Thermoplastic Rubber, fluid resistance, Advanced Elastomer Systems, pp. 1–2, Copyright 1992.

Vichem Corporation, Material Safety Data Sheet, May 30, 1990.

Kraton, Processing and Fabricating Kraton thermoplastic rubber compounds, Shell Chemical Company, pp. 1–26, Apr., 1988.

Material Safety Data Sheet, Shell, pp. 1, 3, 5, 1, Aug. 10, 1990.

Kraton, Compounds Properties Guide, Shell Chemical Company.

Kraton Rubber Automotive Compound Characteristics.

Kraton, Typical Properties, 1990, Shell Chemical Company, pp. 1–11.

Sarlink 100 Series, Material Safety Data Sheet, DSM Thermoplastic Elastomers, Inc., Jan. 14, 1992, pp. 1–4.

Sarlink Thermoplastic Elastomers, The Alternative TPEs, Jan. 14, 1992.

Data Sheet, Sarlink 1570, Fuel Resistant Thermoplastic Elastomer For Marine Hose Applications, Nov., 1989.

Nonmetallic Air Brake System Tubing—SAEJ844, Jun., 1990 SAE Standard.

Kirk–Othmer, Encyclopedia of Chemical Technology, 3rd Edition vol. 18, (New York, John Wiley & Sons) pp. 406–425, Copyright 1982.

CORRUGATED POLYMERIC TUBING HAVING AT LEAST THREE LAYERS WITH AT LEAST TWO RESPECTIVE LAYERS COMPOSED OF POLYMERIC MATERIALS DISSIMILAR TO ONE ANOTHER

RELATED APPLICATIONS

This application is a continuation-in-part of Ser. No. 07/868,754, filed Apr. 14, 1992 currently before the United States Patent and Trademark Office. This application is a continuation-in-part of Ser. No. 07/962,496 and is related to Ser. No. 07/962,300 as one of two applications which were dispatched for filing in the United States Patent and Trademark Office on Oct. 16, 1992.

FIELD OF THE INVENTION

The present invention relates to a corrugated tubing. More particularly, the present invention relates to multi-layer tubing having at least one region of corrugation.

BACKGROUND OF THE INVENTION

Single layer fuel lines and vapor return lines manufactured from synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 g/m$^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 g/m$^2$ per 24 hour period would be required. Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11 and Nylon 12.

Alcohol and aromatic compounds in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick corrosion-resistant outer layer formed of a material known to be durable and resistant to environmental degradation such as Nylon 11 or Nylon 12. The tubing disclosed in this reference also includes a thick intermediate layer composed of conventional Nylon 6. The outer and intermediate layers are bonded together by a thin intermediate bonding layer composed of a polyethylene or a polypropylene having active side chains of maleic acid anhydride. A thin inner layer of after-condensed Nylon 6 with a low monomer content is employed as the innermost region of the tubing. The use of Nylon 6 as the material in the inner fluid contacting surface is designed to eliminate at least a portion of the monomer and oligomer dissolution which would occur with Nylon 11 or Nylon 12. The thin innermost layer is bonded to the thick intermediate layer by a solvent blocking layer formed of a copolymer of ethylene and vinyl alcohol with an ethylene content between about 30% and about 45% by weight. The use of a five layer system was mandated in order to obtain a tubing with the impact resistance of Nylon 12 with the low monomer/oligomer production of Nylon 6. It was felt that these characteristics could not be obtained in a tubing of less than five layers.

In U.S. Pat. No. 5,038,833 also to Brunnhofer, a three-layer fuel line without the resistance to monomer/oligomer dissolution is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides, preferably modified or unmodified Nylon 6. The outer layer is composed of either Nylon 6 or Nylon 12.

Another tubing designed to be resistant to alcoholic media is disclosed in UK Application Number 2 204 376 A in which a tube is produced which has an thick outer layer composed of 11 or 12 block polyamides such as Nylon 11 or Nylon 12 which may be used alone or combined with 6 carbon block polyamides such as Nylon 6 or 6.6 Nylon. The outer layer may be co-extruded with an inner layer made from alcohol-resistant polyolefin co-polymer such as a co-polymer of propylene and maleic acid.

Heretofore it has been extremely difficult to obtain satisfactory lamination characteristics between dissimilar polymer layers. Thus all of the multi-layer tubing proposed previously has employed polyamide-based materials in most or all of the multiple layers. While many more effective solvent-resistant chemicals exist, their use in this area is limited due to limited elongation properties, strength and compatibility with Nylon 11 and Nylon 12.

In order to overcome these problems, multi-layer tubing material employing chemically different layers has been proposed in co-pending application Ser. Nos. 07/897,302, 07/897,376 and 07/896,824 to Noone and Mitchell, the inventors of the present invention. These tubing materials generally employ an outer polyamide layer bonded to an inner hydrocarbon resistant layer by means of a suitable intermediate bonding layer. While such materials do provide the desired characteristics of resistance to hydrocarbon permeation, the tubing produced is generally straight material which is difficult to successfully bend to conform to the contours in an automotive vehicle.

In most automotive applications, the tubing employed must be capable of bending to a variety of angles throughout its length to conform to the layout and the space requirements in the specific vehicle design. Various polymeric materials possess significant elastic memories which makes it difficult to successfully bend pieces of tubing into the permanent shape or contours necessary in the particular automotive application. Other polymeric materials are too rigid so that bends introduced into the material will cause crimping; thereby restricting flow therethrough and can experience significant reductions in its useful life due to fatigue and stress at or near the bend region. Furthermore bending previously known tubing can cause the differing layers to delaminate or fail due, in part, to the fact that the various layers each have very different elasticity and fatigue characteristics.

In order to obviate this problem, it has been proposed that conventional mono-layer tubing be corrugated at the appropriate bend regions. The bend region may include a plurality of annularly oriented accordion-like pleats which permit the region in which the pleats are located to be bent without constricting the interior opening or posing undue stress on the tubing material. This is accomplished by compressing one side of the each of the annular pleats in on themselves while the opposing side of can be extended outwardly from one another to accommodate the necessary angular contour. Heretofore no corrugated multi-layer tubing has been produced which incorporates chemically different layer materials in a single uniformly laminated wall.

Additionally no corrugated tubing has been produced or suggested which incorporates multiple layers of polymeric material having differing chemical properties. Without being bound to any theory, it is believed that conventional extrusion and tube forming processes are incapable of producing such material; particularly corrugated material having wall thicknesses below about 0.75 mm.

It would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. It would also be desirable to provide a tubing material which exhibits these characteristics which has localized or overall areas of corrugation.

SUMMARY OF THE INVENTION

The present invention is a multi-layer tube suitable for use on motor vehicles which is composed of a cylindrical wall which has an outer surface, and an inner surface essentially parallel to the outer surface which defines an essentially unobstructed circular interior opening extending longitudinally through the tube. The cylindrical wall is characterized by a first region in which the cylindrical wall is essentially parallel to a longitudinal axis running coaxially through the cylindrical interior.

Contiguous to the first region is a second region which is defined by at least one corrugation in the cylindrical wall. Each corrugation comprises a region of cylindrical wall which deviates from a first surface disposed at a first radial distance from the longitudinal axis as defined in the first region. Thus, the first region is defined by a cylindrical region having an essentially uniform cross-sectional diameter, while the second region has a cross-sectional diameter which varies depending on position with respect to the corrugation's longitudinal length and has a diameter different from the essentially uniform cross-sectional diameter of the first region. The varying diameter of the second region is preferably greater than the diameter of the first region.

The cylindrical wall of the tubing of the present invention comprises:

a thick flexible outer layer having an inner and an outer face, the outer layer consisting essentially of an extrudable, melt-processible thermoplastic having an elongation value at break of at least 150% and an ability to withstand impacts of at least 2 foot-pounds at temperatures below about −20° C.;

a thin intermediate bonding layer bonded to the inner face of the thick outer tubing, the bonding layer consisting essentially of an extrudable, melt-processible thermoplastic resistant to permeation by short-chain hydrocarbons, the bonding layer consisting of a thermoplastic which is chemically dissimilar to the extrudable thermoplastic employed in the outer tubing and is capable of sufficiently permanent laminar adhesion to the inner face of the thick outer tubing; and an interior layer composed of an extrudable, melt-processible thermoplastic which is capable of sufficiently permanent laminar adhesion to the intermediate bonding layer, the thermoplastic material in the interior layer having an elongation value at break of at least 150% and an ability to withstand impacts of at least 2 foot-pounds below about −20° C., the inner layer having a thickness less than the thickness of the outer tubing.

DESCRIPTION OF THE DRAWING

The objects, features and advantages of the present invention will become more readily apparent from the following description, reference being made to the following drawing in which the Figures in which like reference numerals are employed to refer to like elements throughout the various figures, and in which.

DESCRIPTION OF THE PREFERRED EMBODIMENT

Figure 1:
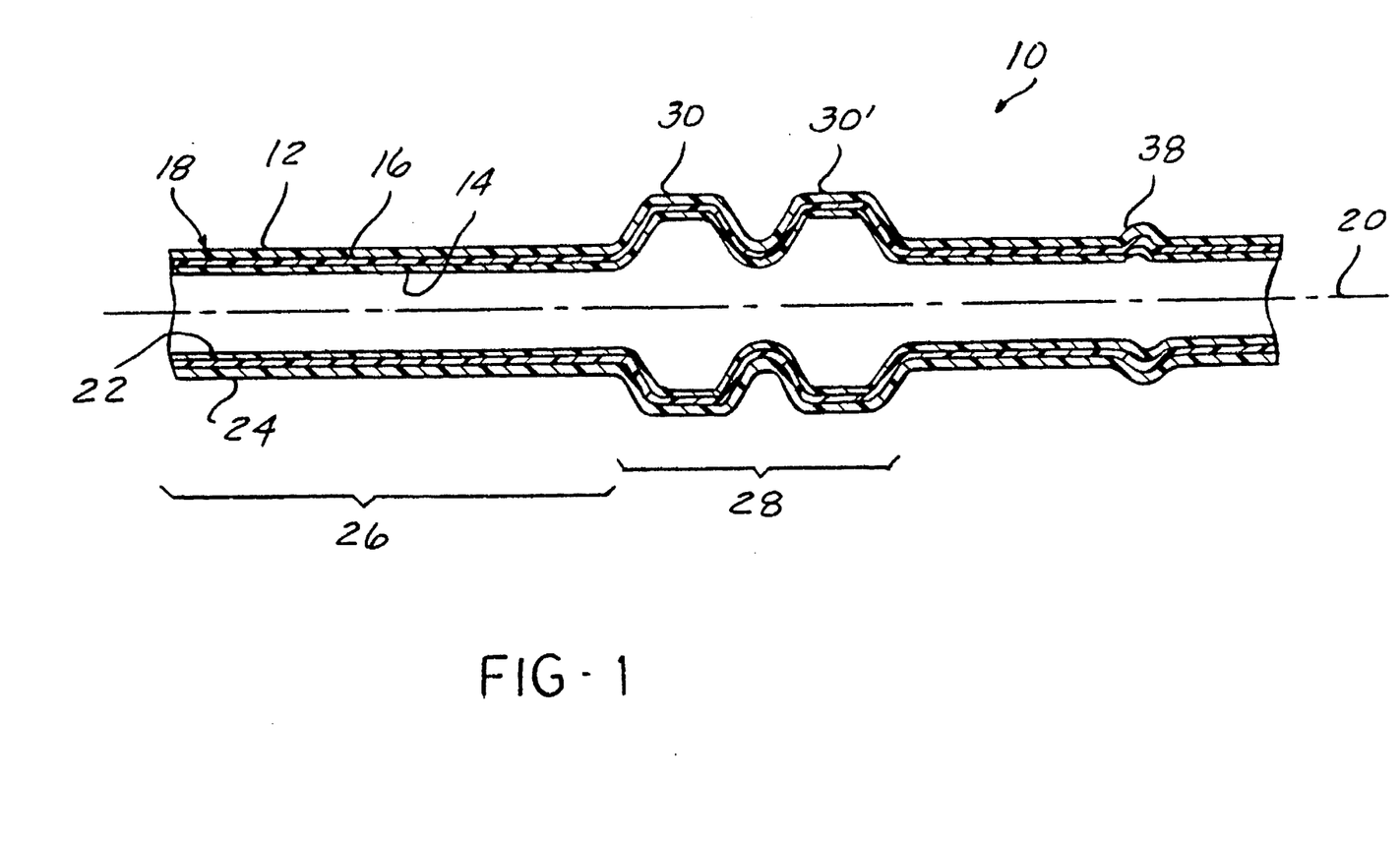
FIG. 1 is a sectional view through a piece of tubing of the present invention without conductive in any of the various layers.
Figure 2:
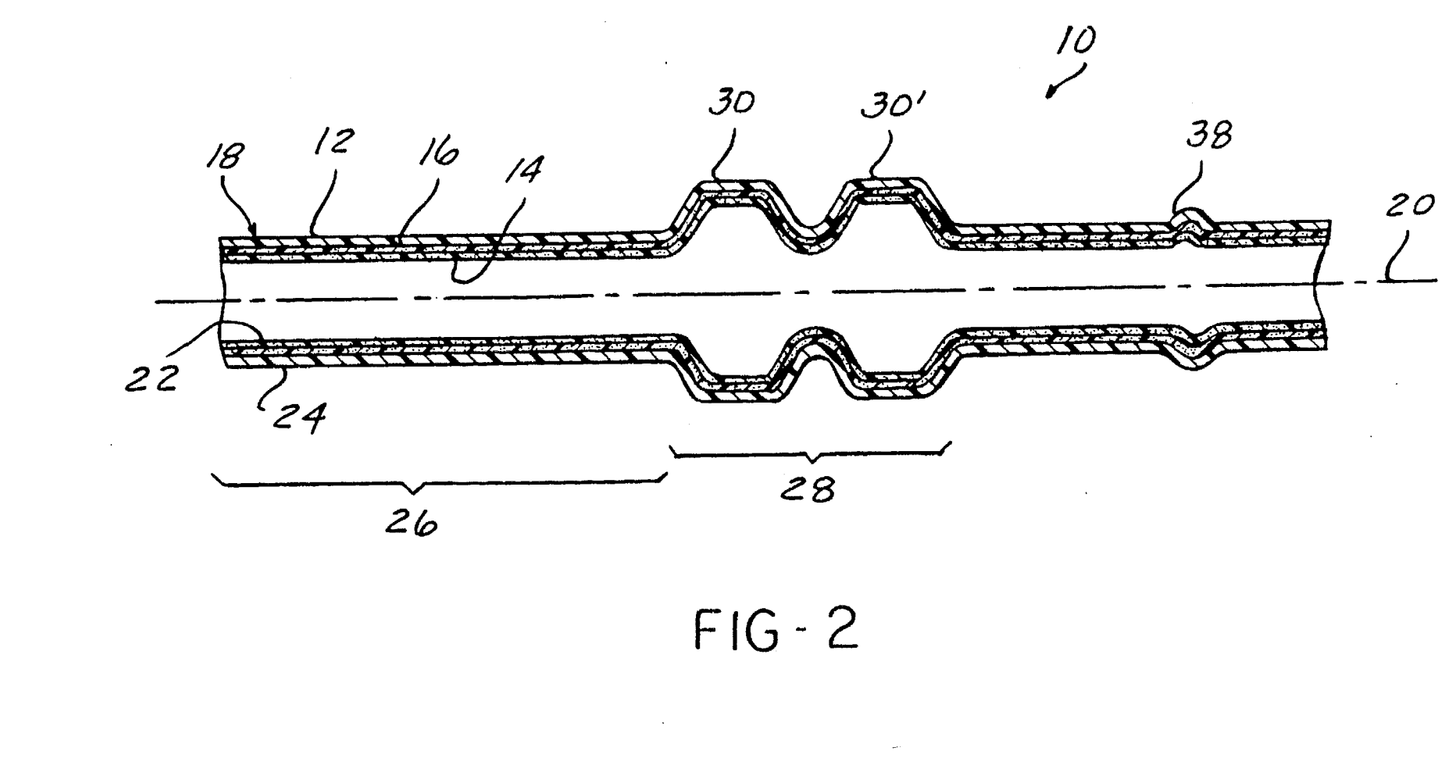
FIG. 2 is a sectional view through a piece of tubing of the present invention in which stippling is included to denote the conductive material employed in the interior layers.

The present invention is a multi-layer fuel line and vapor tube 10 which contains at least one bonding layer 16, at least an outer 12 and an inner layer 14. The tubing 10 of the present invention is defined by at least one corrugated region 28 located in its length to accommodate bending, flexing or twisting. The multi-layer tubing 10 with localized corrugated regions 28 can be produced by a process in which linear tubing material having multiple laminated layers is formed by coextrusion and is molded to provide the corrugation and contour desired.

The tubing 10 may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameters of up to 50.8 mm (2 inches) are preferred.

The material may have any suitable wall thickness desired. However, in automotive systems such as those described herein, wall thicknesses between 0.5 mm and 2.0 mm are generally employed with wall thicknesses of approximately 0.8 to 1.5 mm being preferred. While it is within the scope of this invention to prepare tubing having a plurality of overlaying layers of various thermoplastic materials, the tubing 10 of the present invention generally has a maximum of five layers inclusive of the bonding layers. In the preferred embodiment, the tubing 10 has three or four layers.

The tubing 10 of the present invention is a material which is suitable for use in motor vehicles and comprises a relatively thick outer layer 12 which is nonreactive with the external environment and can withstand various shocks, vibrational fatigue, and changes in temperature as well as exposure to various corrosive or degradative compounds to which it would be exposed through the normal course of operation of the motor vehicle.

It is anticipated that both the outer layer 12 as well as any interior layers bonded thereto would be suitable for use at an outer service temperature range between about −40° C. and about 150° C., with a range of 20° C. to 120° C. being preferred. The various layers of the tubing 10 are integrally laminated to one another and resistant to delamination throughout the lifetime of the tubing 10. The multi-layer tubing 10 will have a tensile strength of no less than 25 N/mm$^2$ and an elongation value at break of at least 150%. The tubing 10 will have a burst strength at 23° C. and 120° C. of at least 20 bar. The multi-layer tubing 10 of the present invention is sufficiently resistant to exposure to brake fluid, engine oil and peroxides such as those which may be found in gasoline.

The outer layer 12 may be composed of any melt-processible extrudable thermoplastic material which is resistant to ultra violet degradation, extreme changes in heat and exposure to environmental hazards such as zinc chloride, and degradation upon contact with engine oil and brake fluid. In general, the outer layer 12 is selected from the group consisting of 12 carbon block polyamides, 11 carbon block polyamides, as well as zinc chloride resistant 6 carbon block polyamides thermoplastic elastomers. These thermoplastic elastomers are compositions and commercially available under tradenames such as SANTOPRENE®, KRATON®, SARLINK and VICHEM. These materials which compose the outer layer 12 can be present in their unmodified state or can be modified with various plasticizers, flame retardants and the like in manners which would be known to one reasonably skilled in the art.

In one preferred embodiment, a polyamide such as Nylon 12 can be effectively employed. It is anticipated that a thermoplastic such as Nylon 12 may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

The outer layer 12 when using Nylon 12 preferably has a wall thickness between about 0.5 mm and about 0.9 mm with a preferred range being between about 0.7 and about 0.8 mm. As indicated previously, the material is extruded by conventional co-extrusion methods to any continuous length desired.

In a second preferred embodiment, the outer layer 12 consists essentially of 6-carbon block polyamides, such as Nylon 6, which are resistant to degradation upon exposure to zinc chloride. The Nylon 6 which composes the outer 12 layer can be employed can also be modified with various plasticizers, flame retardants and the like in manners which would be known to one reasonably skilled in the art.

In this second preferred embodiment, the outer layer 12 is composed of a polyamide thermoplastic derived from the condensation polymerization of caprolactam. Such materials are commonly referred to as 6-carbon block polyamides or Nylon 6. In the preferred embodiment, the 6-carbon block polyamide either inherently exhibits zinc chloride resistance or contains sufficient quantities of modifying agents to impart a level of zinc chloride resistance greater than or equal to that required by Performance Requirement 9.6 as outlined in SAE Standard J844, i.e. non-reactivity after 200 hour immersion in a 50% by weight zinc chloride solution. In the preferred embodiment, the 6-carbon block polyamide material is a multi-component system comprised of a Nylon-6 copolymer blended with other Nylons and olefinic compounds. The zinc-chloride resistant Nylon-6 of choice will have a melt temperature between about 220° C. and 240° C. Examples of thermoplastic materials suitable for use in the tubing 10 of the present invention are materials which can be obtained commercially under the tradenames M-7551 from NYCOA Corporation and ALLIED 1779 from Allied Chemical.

As with the Nylon 12, the 6-carbon black polyamide may, optionally, include other modifying agents such as various plasticizing agents generally present in amounts between about 1.0% and about 13% by total weight of the thermoplastic composition, as are readily known in the art. The polyamide material employed, preferably, is an impact-modified material capable of withstanding impacts of at least 2 foot-pounds at temperatures below about −20° C.

In the method of the present invention, the Nylon 6 or the Nylon 12 is continuously extruded from a suitable coextrusion head with a wall thickness sufficient to accommodate localized expansion and elongation in molded and contoured regions. The contoured regions may evidence or experience a degree of localized stretching or thinning but will have sufficient initial thickness to withstand the expansion without compromising the integrity of the multi-layer wall structure. In the preferred embodiment, the outer layer is extruded to an initial wall thickness between about 0.5 mm and about 2.5 mm with a preferred thickness between about 0.75 mm and about 1.25 mm.

The thermoplastic material employed in the inner layer 14 of the present invention is a melt-processible extrudable thermoplastic material resistant to extreme changes in heat and exposure to chemical intervals such as are found in engine oil and brake fluid. The preferred material will have an elongation value at break of at least 150%.

The thermoplastic material of choice is, preferably, chemically similar in structure and composition to the thermoplastic material employed in the thick outer layer 12. As used herein, the term "chemically similar material" is defined as a thermoplastic material selected from the group consisting of 12 carbon block polyamides, 11 carbon block polyamides as well as zinc chloride resistant 6 carbon block polyamides, thermoplastic elastomers and mixtures thereof. The thermoplastic elastomers which can successfully be employed in the tubing 10 of the present invention are compositions commercially available under tradenames such as SANTOPRENE®, KRATON®, SARLINK and VICHEM.

The thermoplastic material employed in the inner layer 14 of the tubing 10 of the present invention either may be identical to the material employed in the thick outer layer 12 or may be a different thermoplastic selected from those listed to take advantage of specific properties of the various thermoplastics. In the preferred embodiment, the inner layer 14 is composed of a material similar to or identical to the thick outer layer 12. Polyamides such as Nylon 12 can be effectively employed. Alternately, a polyamide derived from the condensation polymerization of caprolactam can be employed. Suitable materials are commonly referred to as 6-carbon block polyamides or Nylon 6. The 6-carbon block polyamides employed herein may contain sufficient quantities of modifying agents to impart a level of zinc chloride resistance greater than or equal to that required by test method SAE J844: i.e. non-reactivity after 200 hour immersion in a 50% by weight aqueous zinc chloride solution.

The thermoplastic employed in the inner layer 14 may be either modified or unmodified. If modified, it is anticipated that the material will contain various plasticizers as are readily known in the art. In the preferred embodiment, the polyamide will contain up to 17% by composition weight plasticizer; with amounts between about 1% and about 13% being preferred.

Where a 6-carbon block polyamide material is employed, it is generally part of a multi-component system comprised of a Nylon-6 copolymer blended with other Nylons and olefinic compounds. The 6-carbon block polyamide material of choice is preferably resistant to zinc chloride and has a melt temperature between about 220° C. and 240° C. Examples of thermoplastic materials suitable for use in the tubing 10 of the present invention are propriety materials which can be obtained commercially under the tradenames M-7551 from NYCOA Corporation and ALLIED 1779 from Allied Chemical.

In instances where the 6-carbon block polyamide material includes plasticizing agents, these materials are generally present in amounts between about 1.0% and about 13% by total weight of the thermoplastic composition.

The inner layer 14 may have a thickness sufficient to supply strength and chemical resistance properties to the multi-layer tubing 10. Specifically, the inner layer 14 is of sufficient thickness to impede permeation of aliphatic and aromatic hydrocarbon molecules and migration of those molecules through to the thick outer layer 12. In the present invention, the inner layer 14 has a wall thickness less than that of the thick outer layer 12. In the preferred embodiment, the inner layer 14 has a wall thickness between about 40% and 60% that of the outer layer 12; between about 0.05 mm and about 0.2 mm; with a wall thickness between about 0.05 mm and about 0.17 mm being preferred.

The inner layer 14 may also, optionally, contain suitable material in sufficient quantities to impart electrostatic conductivity characteristics to the tubing 10 of the present invention. When employed, the material is preferably capable of dissipation of electrostatic charges in the range of $10^{-4}$ to $10^{-9}$ Ohm/cm$^2$. The thermoplastic material employed in the present invention may include, in its composition, a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the thermoplastic is generally limited by considerations of low temperature durability and resistance to the degradative effects of the gasoline or fuel passing through the tubing 10. The amount of conductive material employed may be that amount sufficient to impart electrostatic dissipation characteristics to the tubing 10. When employed, the maximum amount of conductive material in the thermoplastic material is less than 5% by volume.

The conductive material can either be blended into the crystalline structure of the polymer or can be incorporated during the polymerization of monomers which make up the thermoplastic therewith. Without being bound to any theory, it is believed that carbon-containing materials such as carbon black may be incorporated during polymerization of the surrounding thermoplastic material. Materials such as stainless steel are more likely to be blended into the crystalline structure of the polymer.

In order to accomplish effective lamination of the two thermoplastic materials which compose the inner layer 14 and outer layer 12, the tubing 10 of the present invention also includes at least one intermediate layer 16 interposed between the two previously described layers and co-extruded therewith which is capable of achieving a suitable homogeneous bond between itself and the two respective layers. Preferably, the inner layer 14 is permanently and uniformly bonded to the outer layer 12 by the intermediate bonding layer 16. The intermediate bonding layer 16 is generally composed of a more elastic material than that employed in the inner layer 14.

In the present invention, the interior bonding layer 16 is a chemically dissimilar, permeation resistant, chemical resistant, fuel resistant thermoplastic material which is melt-processible in normal ranges of extrusion, i.e. about 175° to about 250° C. The material of choice has an elongation value at break greater than about 150% with an elongation value at break between about 150% and about 250% being preferred. By the term "chemically dissimilar", it is meant that the intermediate bonding layer 16 is a non-polyamide material which is capable of integral adhesion with and between the thick outer layer 12 and the inner layer 14 as a result of co-extrusion.

The intermediate bonding layer 16 is composed of a thermoplastic material which permits the establishment of a homogeneous bond between the inner layer 14 and outer layer 12 and exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents.

In the preferred embodiment, the thermoplastic material which comprises the intermediate bonding layer 16 is a thermoplastic polyester derived from ethylene glycol selected from the group consisting of polybutylene terephthalate, polyethylene terephthalate, polyteremethylene terephthalate, co-polymers of substituted or unsubstituted alkenes having less than four carbon atoms and vinyl alcohol, copolymers of alkenes having less than four carbon atoms and vinyl acetate, and mixtures thereof. The preferred material is selected from the group consisting of polybutylene terephthalate and copolymers of ethylene and vinyl alcohol having an ethylene content between about 27% and about 35% by weight. Where ethylene vinyl alcohol copolymers are employed, polymers with an ethylene content between about 27% and about 32% are preferred. Suitable polybutylene terephthalate material is commercially available under the tradename 1607 ZE40 from Hüls of Dusseldorf, Germany. Suitable EVA materials which can be employed in the tubing of the present invention include ethylene vinyl alcohol commercially available from EVA/LA.

The material employed in the intermediate bonding layer 16 can, optionally, exhibit conductive characteristics rendering it is capable of dissipation of electrostatic charges in the range of $10^{-4}$ to $10^{-9}$ Ohm/cm$^2$. The thermoplastic material employed in the present invention may include, in its composition, a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the thermoplastic is generally limited by considerations of low temperature durability and resistance to the degradative effects of the gasoline or fuel passing through the tubing 10. The amount of conductive material employed may be that amount sufficient to impart electrostatic dissipation characteristics to the tubing 10. When employed, the maximum amount of conductive material in the thermoplastic material is less than 5% by volume.

The conductive material can either be blended into the crystalline structure of the polymer or can be incorporated during polymerization of monomers that make up the polymer. Without being bound to any theory, it is believed that carbon-containing materials such as carbon black may be incorporated during the polymerization of the surrounding thermoplastic material. Materials such as stainless steel are more likely to be blended into the crystalline structure of the polymer.

The thermoplastic material employed in the bonding layer 16 also exhibits characteristics which permit resistance to permeation by short chain aromatic and aliphatic compounds. These permeation resistant characteristics synergistically interact with the inner polyamide layer 14 such that the total permeation resistance is unexpectedly increased when the thermoplastic bonding layer 16 is bonded to the inner polyamide layer 14. Thus, the resistance to permeation to short chain aromatic and aliphatic hydrocarbons exhibited by the multi-layer tubing 10 exceeds the permeation resistance exhibited by individual layers of either polybutylene terephthalate or polyamide of a thickness equal to or greater than the multi-ply composite of the present invention.

The material employed in the inner layer 14 generally has a degree of expansion greater than that of the outer layer 12. In general, the elongation value at break of the inner layer is between about 150% and about 250%. The material generally has an elastic memory which can result in the contraction of the material to about 200% of its elongated value upon stretching or other deformative activities.

In the preferred embodiment, the intermediate bonding layer 16 is preferably maintained at the minimum thickness necessary to achieve effective bonding between the inner layer 14 and outer layer 12. Furthermore, the intermediate bonding layer 16 can also function in concert with the inner layer 14 to prevent permeation of the fuel through the tubing 10. As indicated previously, it is preferred that the amount of hydrocarbon permeation not exceed 0.5 gm/m$^2$ in a 24 hour interval. Thus where the bonding layer 16 contributes to permeation resistance, it is anticipated that the thickness of the inner layer 14 and intermediate bonding layer 16 can be modified to accomplish this end.

In addition to permitting the establishment of a homogeneous bond between the inner layer 14 and outer layer 12, the intermediate bonding layer 16 can also exhibit resistance to the permeation of aliphatic and aromatic compounds therethrough. Furthermore the intermediate bonding layer 16 may exhibit conductive or static dissipative characteristics such as those described previously. Thus the intermediate bonding layer 16 may optionally include sufficient amounts of conductive media to effect electrostatic dissipation in the range of $10^{-4}$ to $10^{-9}$ Ohm/cm$^2$. As with the inner layer 14, the intermediate bonding layer 16 may be inherently electrostatically dissipative or may be rendered so by the inclusion of certain conductive materials such as those selected from the group consisting of elemental carbon, stainless steel, copper, silver, gold, nickel, silicon, and mixtures thereof.

The intermediate bonding layer 16 is of sufficient thickness to permit an essentially homogeneous bond between the inner layer 14 and outer layer 12. In general, the intermediate bonding layer 16 can be thinner than the other two layers and can constitute between about 10% and about 50% of the total wall thickness or between about 20% and about 30% of the thickness of the outer layer 12. In the specified embodiment, the thickness of the intermediate bonding layer 16 is between about 0.05 mm and about 0.2 mm.

The multi-layer tube 10 of the present invention is composed of an elongated cylindrical wall 18 which preferably has an essentially circular cross-section perpendicular to its longitudinal axis 20. The cylindrical wall 18 has an essentially uniform wall thickness throughout its length and circumference and is defined by an inner surface 22 and an opposed outer surface 24. The inner surface 22 defines an essentially cylindrical opening which extends longitudinally through the tubing 10 of the present invention essentially coaxial to the longitudinal axis 20.

The cylindrical wall 18 of the multi-layer tube 10 comprises at least two distinct regions. The cylindrical wall 18 has a first region 26 where the cylindrical wall 18 is essentially parallel to the longitudinal axis 20. Contiguous to the first region 26 is a second region 28 which is defined by at least one convolution or corrugation 30 in the cylindrical wall 18. As used herein, the term convolution is defined as an area of cylindrical wall 18 which deviates from parallel to the longitudinal axis 20, and preferably deviates outward from a position parallel to the longitudinal axis 20. This deviation can produce an inner diameter which is between about 20% and 300% greater than the inner diameter of the first region 26 at its maximum. In the preferred embodiment, the inner diameter of the convolution 30 is between 20% and 100% greater than the inner diameter of the first region 26.

The tubing 10 of the present invention can have as many convolutions with any length of cylindrical tubing optionally interposed therebetween as would be necessary to achieve the degree of flexibility required. The geometry of the convolutions can be of any cross-sectional profile desired. Thus the convolutions 30 may have angled, squared, or sinusoidal profiles as desired. In the preferred embodiment, it is anticipated that the tubing 10 of the present invention will have sufficient convolutions positioned on the length of the tubing 10 to accommodate bends of over 90° from vertical. It is to be understood that the tubing 10 of the present invention can be customized to suit the end user. Thus, in situations were such acute bends are not required, the tubing can have fewer or shallower convolutions.

In effecting a bend such as an angular bend in the tubing 10 of the present invention, a longitudinal area on one side of the second region 26 can be compressed so that the segments of the various convolutions 30 are brought into lateral contact with one another while the diametrically opposed longitudinal area is reciprocally elongated.

The tubing 10 may also include various molded flanges and the like such as hose barb 38 shown in the drawing Figures. It is to be understood that in hose barb 38, as in all molded regions, the wall thickness remains essentially constant linearly throughout the outwardly expanded region as do the relative thicknesses of the various multiple layers.

Thus the present invention is a multi-layer tubing material which can accommodate the introduction of various bends and contours during installation. The material thus produced is durable and resistant to delamination during installation and use. The present invention discloses an elongated multi-layer tubing for connection to a motor vehicle system for handling fluids containing hydrocarbons. The tube is defined by a wall having essentially parallel inner and outer surfaces. The inner surface defines an essentially unobstructed longitudinally extending passage within an interior of the tubing. The wall has a longitudinally extending first region with an essentially uniform cross-sectional configuration and a longitudinally extending second region with at least one corrugation of a varying cross-sectional configuration. The second region has a cross-sectional area at least as large as a cross-sectional area of the first region. The second region permits bending of the tubing such that the longitudinal axis of the tubing is non-linear. The wall is formed by multiple layers of essentially constant thicknesses bonded permanently and uniformly to one another throughout the first and second regions. The multiple layers include a first layer consisting essentially of an extrudable, melt-processible thermoplastic having an elongation value at break of at least 150% and an ability to withstand impacts of at least 2 foot-pounds at temperatures below about −20° C., a second layer homogeneously bonded to the first layer, the second layer consisting essentially of an extrudable, melt-processible thermoplastic resistant to permeation by short-chain hydrocarbons, the second layer consisting essentially of a thermoplastic chemically dissimilar to the thermoplastic employed in the first layer and capable of sufficiently permanent laminar adhesion to the first layer to prevent delamination during a desired lifetime of the tubing, and a third layer consisting essentially of an extrudable, melt-processible thermoplastic homogeneously bonded to the second layer, the third layer capable of sufficiently permanent laminar adhesion to the second layer to prevent delamination during the desired lifetime of the tubing, the extrudable, melt-processible thermoplastic material of the third layer having an elongation value at break of at least 150% and an ability to withstand impacts of at least 2 foot-pounds below about −20° C., the thickness of the third layer less than the thickness of the first layer.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

The vinyl compounds from Vichem Corporation of Allendale, Mich. are polyvinyl chloride compounds composed of a vinyl resin and functioning additives. The ingredients include a stabilizer, a resin CAS No. 75-01-4, a plasticizer CAS No. 68515-49-1, an epoxy soya oil CAS No. 8013-07-8, a filler CAS No. 1317-65-3 and carbon black CAS No. 1333-85-4. The specific gravity is 1.35 and the compound has the appearance of pellets and has a characteristically bland odor.

KRATON® is a thermoplastic rubber having a specific gravity of 0.90 to 1.90 and a hardness of 15 A to 60 D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

The invention claimed is:

1. A multi-layer tubing suitable for use on motor vehicles comprising a cylindrical wall having an outer surface, and an inner surface essentially parallel to the outer surface, the inner surface defining an essentially cylindrical interior, said essentially cylindrical interior extending longitudinally through the tubing coaxial to a longitudinal axis, the cylindrical wall itself comprising:

a first region having an essentially uniform cross-sectional diameter in which the cylindrical wall has a flat longitudinal cross-section, the cylindrical wall oriented essentially parallel to the coaxial longitudinal axis; and a second region in which the cylindrical wall has at least one convolution having a cross-sectional diameter which varies positionally depending on longitudinal location in the second region, the convolution having cross-sectional diameter different from the essentially uniform cross-sectional diameter of the first region, the cylindrical wall of the multi-layer tubing further comprising:

a thick flexible outer layer having an inner and an outer face, the outer layer consisting essentially of an extrudable melt-processible thermoplastic selected from the group consisting of twelve-carbon block polyamides, eleven-carbon block polyamides, six-carbon block polyamides, thermoplastic elastomers, and mixtures thereof;

a thin intermediate bonding layer homogeneously bonded to the inner face of the thick outer layer, the bonding layer consisting essentially of an extrudable melt-processible thermoplastic resistant to permeation by short-chain hydrocarbons, the thin intermediate bonding layer consisting of a thermoplastic which is chemically dissimilar to the extrudable thermoplastic employed in the thick outer layer and is capable of sufficiently permanent laminar adhesion to the inner face of the thick outer layer;

an interior layer composed of an extrudable melt-processible thermoplastic homogeneously bonded to the intermediate bonding layer, the extrudable melt-processible thermoplastic of the interior layer being capable of sufficiently permanent laminar adhesion to the intermediate bonding layer, the extrudable melt-processible thermoplastic material of the interior layer selected from the group consisting of twelve-carbon block polyamides, eleven-carbon block polyamides, six-carbon block polyamides, and mixtures thereof, the inner layer having a thickness less than the thickness of the outer layer; and wherein thicknesses of each respective layer remains essentially constant throughout the convolution in the second region.

2. The tubing as defined in claim 1 wherein the cross-sectional diameter of the convolution located in the second region of the cylindrical wall is between about 20% and about 300% greater than the inner diameter of the first region.

3. The tubing as defined in claim 2 wherein the cross-sectional diameter of the convolution located in the second region of the cylindrical wall is between about 20% and about 100% greater than the inner diameter of the first region.

4. The tubing of claim 2 wherein the convolution has an angled longitudinal cross-sectional profile.

5. The tubing of claim 2 wherein the convolution has a squared longitudinal cross-sectional profile.

6. The tubing of claim 2 wherein the convolution has a sinusoidal longitudinal cross-sectional profile.

7. The tubing of claim 2 wherein the inner diameter of the first region is less than about 2.0 inches.

8. The tubing of claim 1 wherein the thermoplastic material employed in the interior layer contains conductive media in a quantity sufficient to provide an electrostatic dissipation capacity between about $10^{-4}$ to $10^{-9}$ Ohm/cm$^2$.

9. The tubing of claim 1 wherein the interior layer further contains a conductive material selected from the group consisting of elemental carbon, copper, silver, gold, nickel, silicon, and mixtures thereof, the conductive material being present in an amount sufficient to provide the interior layer with an ability to dissipate electrostatic energy in a range between about $10^{-4}$ to $10^{-9}$ Ohm/cm$^2$.

10. The tubing of claim 9 wherein the conductive material is present in an amount less than about 5% by volume of the polymeric material.

11. The tubing of claim 10 wherein the conductive material is blended into the thermoplastic material.

12. The tubing of claim 10 wherein the conductive material is elemental carbon and is incorporated during polymerization of monomers that make up the extrudable thermoplastic material.

13. The tubing of claim 1 wherein the extrudable thermoplastic of the thick outer layer is a polyamide selected from the group consisting of Nylon 11, Nylon 12, zinc chloride resistant Nylon 6, and mixtures thereof.

14. The tubing of claim 1 wherein the thermoplastic material employed in the intermediate bonding layer includes as a major constituent an extrudable, melt-processible thermoplastic polyester selected from the group consisting of polybutylene terephthalate, polyethylene terephthalate, polyteremethylene terephthalate, and mixtures thereof.

15. The tubing of claim 14 wherein the thermoplastic material employed in the intermediate bonding layer consists essentially of polybutylene terephthalate.

16. A multi-layer tubing suitable for use on motor vehicles comprising a cylindrical wall having an outer surface, and an inner surface essentially parallel to the outer surface, the inner surface defining an essentially cylindrical interior, said essentially cylindrical interior extending longitudinally through the tubing coaxial to a longitudinal axis, the cylindrical wall itself comprising:

a first region having an essentially uniform cross-sectional diameter in which the cylindrical wall has a flat longitudinal cross-section, the cylindrical wall oriented essentially parallel to the coaxial longitudinal axis; and a second region in which the cylindrical wall has at least one convolution having a cross-sectional diameter which varies positionally depending on longitudinal location in the second region, the convolution having cross-sectional diameter different from the essentially uniform cross-sectional diameter of the first region, the cross-sectional diameter of the convolution having a maximum value which exceeds the inner diameter of the first section by an amount between about 20% and about 300%, the cylindrical wall of the multi-layer tubing further comprising:

a thick outer layer having an inner and an outer face, the thick outer layer consisting essentially of an extrudable polyamide selected from the group consisting of Nylon 11, Nylon 12, zinc chloride resistant Nylon 6, and mixtures thereof;

an intermediate bonding layer having a thickness between about 0.05 mm and about 0.2 mm homogeneously bonded to the inner face of the thick outer layer, the bonding layer consisting essentially of an extrudable thermoplastic capable of sufficiently permanent laminar adhesion to the polyamide outer layer and exhibiting at least some resistance to short-chain hydrocarbon molecules conveyed through the tubing;

an interior layer homogeneously bonded to the intermediate bonding layer having a thickness between about 0.05 mm and about 0.2 mm, the interior layer consisting essentially of an extrudable, melt-processible thermoplastic capable of sufficiently permanent laminar adhesion with the intermediate bonding layer, the extrudable melt-processible thermoplastic material employed in the interior layer being selected from the group consisting of twelve-carbon block polyamides, eleven-carbon block polyamides, six-carbon block polyamides, and mixtures thereof; and where thicknesses of each respective layer remain essentially constant throughout the convolution in the second region.

17. The tubing of claim 16 wherein the thermoplastic material of the bonding layer contains quantities of a conductive material sufficient to provide electrostatic dissipation capacity in a range between about $10^{-4}$ to $10^{-9}$ Ohm/cm$^2$.

18. The tubing of claim 17 wherein the conductive material is selected from the group consisting of elemental carbon, copper, silver, gold, nickel, silicon, and mixtures thereof and is present in an amount less than about 5% by volume of the extrudable thermoplastic material.

19. The tubing of claim 18 wherein the conductive material is blended into the melt-processible thermoplastic material.

20. The tubing of claim 19 wherein the conductive material is elemental carbon and is incorporated during polymerization of monomers that make up the extrudable thermoplastic material.

21. A multi-layer tubing suitable for use on motor vehicles comprising a cylindrical wall having an outer surface, and an inner surface essentially parallel to the outer surface, the inner surface defining an essentially cylindrical interior, said essentially cylindrical interior extending longitudinally through the tubing coaxial to a longitudinal axis, the cylindrical wall itself comprising:

a first region having an essentially uniform cross-sectional diameter in which the cylindrical wall has a flat longitudinal cross-section, the cylindrical wall oriented essentially parallel to the coaxial longitudinal axis; and a second region in which the cylindrical wall has at least one convolution having a cross-sectional diameter which varies positionally depending on longitudinal location in the second region, the convolution having cross-sectional diameter different from the essentially uniform cross-sectional diameter of the first region, the cylindrical wall of the multi-layer tubing further comprising:

a thick flexible outer layer having an inner and an outer face, the outer layer consisting essentially of an extrudable melt-processible thermoplastic selected from the group consisting of eleven-carbon block polyamides, twelve-carbon block polyamides, six-carbon block polyamides, thermoplastic elastomers, and mixtures thereof;

a thin intermediate bonding layer homogeneously bonded to the inner face of the thick outer layer, the bonding layer consisting essentially of an extrudable melt-processible thermoplastic resistant to permeation by short-chain hydrocarbons, the thin intermediate bonding layer consisting of a thermoplastic which is chemically dissimilar to the extrudable thermoplastic employed in the thick outer layer and is capable of sufficiently permanent laminar adhesion to the inner face of the thick outer layer, the thermoplastic material being an extrudable, melt-processible thermoplastic selected from the group consisting of copolymers of alkenes having less than four carbon atoms and vinyl alcohol, of copolymers of alkenes having less than four carbon atoms and vinyl acetate, and mixtures thereof;

an interior layer composed of an extrudable melt-processible thermoplastic homogeneously bonded to the intermediate bonding layer, the extrudable melt-processible thermoplastic of the interior layer being capable of sufficiently permanent laminar adhesion to the intermediate bonding layer, the extrudable melt-processible thermoplastic material of the interior layer selected from the group consisting of eleven-carbon block polyamides, twelve-carbon block polyamides, six-carbon block polyamides, and mixtures thereof, the inner layer having a thickness less than the thickness of the outer layer;

wherein thicknesses of each respective layer remains essentially constant throughout the convolution in the second region; and wherein the multi-layer tubing has a passive hydrocarbon permeation rate less than 0.5 g/m$^2$ per 24 hour interval.

22. The tubing of claim 21 wherein the thermoplastic material employed in the intermediate bonding layer is selected from the group consisting of copolymers of ethylene and vinyl alcohol having an ethylene content between about 27% and about 32% by weight, the intermediate bonding layer having a thickness between about 0.05 mm and about 0.2 mm.

23. The tubing of claim 22 wherein the interior layer is composed of an extrudable 6-carbon block polyamide derived from condensation polymerization of caprolactam, the interior layer having a thickness between about 0.05 mm and about 0.2 mm.

24. The tubing of claim 23 wherein the outer layer is composed of an extrudable 6-carbon block polyamide derived from condensation polymerization of caprolactam.

25. An elongated multi-layer tubing for connection to a motor vehicle system for handling fluids containing hydrocarbons, the tube comprising:

a wall having essentially parallel inner and outer surfaces, the inner surface defining an essentially unobstructed longitudinally extending passage within an interior of the tubing, the wall having a longitudinally extending first region with an essentially uniform cross-sectional configuration and a longitudinally extending second region with at least one corrugation of a varying cross-sectional configuration, the second region having a cross-sectional area at least as large as a cross-sectional area of the first region, the second region permitting bending of the tubing such that the longitudinal axis of the tubing is non-linear, the wall formed by multiple layers of essentially constant thicknesses bonded permanently and uniformly to one another throughout the first and second regions, the multiple layers including:

a first layer consisting essentially of an extrudable, melt-processible thermoplastic selected from the group consisting of Nylon 11, Nylon 12, Nylon 6, and mixtures thereof;

a second layer homogeneously bonded to the first layer, the second layer consisting essentially of an extrudable, melt-processible thermoplastic resistant to permeation by short-chain hydrocarbons, the second layer consisting essentially of a thermoplastic chemically dissimilar to the thermoplastic employed in the first layer and capable of sufficiently permanent laminar adhesion to the first layer to prevent delamination during a desired lifetime of the tubing; and a third layer consisting essentially of an extrudable, melt-processible thermoplastic homogeneously bonded to the second layer, the third layer capable of sufficiently permanent laminar adhesion to the second layer to prevent delamination during the desired lifetime of the tubing, the extrudable, melt-processible thermoplastic material of the third layer being selected from the group consisting of Nylon 11, Nylon 12, Nylon 6, and mixtures thereof, the thickness of the third layer less than the thickness of the first layer.

26. The tubing of claim 25 wherein the interior layer has a thickness between about 0.05 mm and about 0.2 mm and the thermoplastic material employed in both the outer layer and the interior layer is Nylon 12.

* * * * *

UNITED STATES PATENT AND TRADEMARK OFFICE
CERTIFICATE OF CORRECTION

PATENT NO. : 5,469,892
DATED : November 28, 1995
INVENTOR(S) : David L. Noone and Frank L. Mitchell It is certified that error appears in the above-identified patent and that said Letters Patent is hereby corrected as shown below:

Col. 7, lines 57-58, delete "conductivity" and insert --dissipation--.

Col. 7, line 61, delete "$10^{-4}$ to $10^{-9}$" and insert --$10^{4}$ to $10^{9}$--.

Col. 9, line 15, delete "conductive".

Col. 9, line 17, delete "$10^{-4}$ to $10^{-9}$" and insert --$10^{4}$ to $10^{9}$--.

Col. 10, line 20, delete "conductive or".

Col. 10, line 24, delete "$10^{-4}$ to $10^{-9}$" and insert --$10^{4}$ to $10^{9}$--.

Col. 14, line 15, delete "$10^{-4}$ to $10^{-9}$" and insert --$10^{4}$ to $10^{9}$--.

Col. 14, line 22, delete "$10^{-4}$ to $10^{-9}$" and insert --$10^{4}$ to $10^{9}$--.

UNITED STATES PATENT AND TRADEMARK OFFICE
CERTIFICATE OF CORRECTION

PATENT NO. : 5,469,892
DATED : November 28, 1995
INVENTOR(S) : David L. Noone and Frank L. Mitchell It is certified that error appears in the above-identified patent and that said Letters Patent is hereby corrected as shown below:

Col. 15, line 31, delete "$10^{-4}$ to $10^{-9}$" and insert --$10^4$ to $10^9$--.

Signed and Sealed this

Thirty-first Day of March, 1998

Attest:

BRUCE LEHMAN

*Attesting Officer*     *Commissioner of Patents and Trademarks*